United States Patent
Wu

(10) Patent No.: US 10,328,846 B2
(45) Date of Patent: Jun. 25, 2019

(54) TAIL LIGHT DEVICE FOR AN AUTOMOBILE

(71) Applicant: COPLUS INC., New Taipei (TW)

(72) Inventor: Jacob Wu, Tainan (TW)

(73) Assignee: COPLUS INC., New Taipei (TW)

( * ) Notice: Subject to any disclaimer, the term of this patent is extended or adjusted under 35 U.S.C. 154(b) by 296 days.

(21) Appl. No.: 15/346,902

(22) Filed: Nov. 9, 2016

(65) Prior Publication Data
US 2017/0136942 A1 May 18, 2017

(30) Foreign Application Priority Data

Nov. 17, 2015 (TW) .............................. 104218382 U
Dec. 10, 2015 (TW) .............................. 104219820 U

(51) Int. Cl.
| | | |
|---|---|---|
| B60Q 1/00 | (2006.01) |
| B60Q 1/26 | (2006.01) |
| B60Q 1/30 | (2006.01) |
| F21S 43/14 | (2018.01) |
| F21S 43/19 | (2018.01) |
| F21S 43/27 | (2018.01) |
| F21S 43/31 | (2018.01) |
| F21S 43/50 | (2018.01) |

(Continued)

(52) U.S. Cl.
CPC ......... B60Q 1/2607 (2013.01); B60Q 1/0041 (2013.01); B60Q 1/0052 (2013.01); B60Q 1/30 (2013.01); F21S 43/14 (2018.01); F21S 43/195 (2018.01); F21S 43/241 (2018.01); F21S 43/243 (2018.01); F21S 43/249 (2018.01);
(Continued)

(58) Field of Classification Search
CPC ...... B60Q 1/2607; B60Q 1/0041; B60Q 1/30; B60Q 1/0052; B60Q 1/2603; B60Q 1/44; F21S 43/50; F21S 43/31; F21S 43/249; F21S 43/243; F21S 43/241; F21S 43/27; F21S 43/195; F21S 43/251; F21S 43/26; F21S 43/235; F21S 43/20; F21S 43/19;
(Continued)

(56) References Cited

U.S. PATENT DOCUMENTS 6,024,474 A * 2/2000 Tanaka ................. B60Q 1/2607
362/249.01
7,963,685 B2 * 6/2011 Kowalczyk .......... B60Q 1/2607
362/545
(Continued)

FOREIGN PATENT DOCUMENTS

EP 2390137 A1 * 11/2011 ........... B60Q 1/2607
EP 2796318 A1 * 10/2014 .............. F21S 48/23
(Continued)

OTHER PUBLICATIONS

Leitow Marc, Lighting device for vehicles, Nov. 13, 2014, WO 2014018081 A1.*
(Continued)

*Primary Examiner* — Bryon T Gyllstrom
*Assistant Examiner* — James M Endo
(74) *Attorney, Agent, or Firm* — Burris Law, PLLC

(57) ABSTRACT

A tail light device includes a housing defining an accommodation chamber enclosed by a light shade, a mounting fixture removably connected to a surrounding wall of the housing and having a mounting wall, two first light emitting modules respectively secured to first mounting wall portions of the mounting wall, and a second light emitting module secured to a second mounting wall portion of the mounting wall such that a modular construction is made to be mounted in the accommodation chamber.

5 Claims, 7 Drawing Sheets

(51) Int. Cl.
*F21S 43/235* (2018.01)
*F21S 43/241* (2018.01)
*F21S 43/243* (2018.01)
*F21S 43/249* (2018.01)
*F21Y 115/10* (2016.01)

(52) U.S. Cl.
CPC ............... *F21S 43/27* (2018.01); *F21S 43/31* (2018.01); *F21S 43/50* (2018.01); *F21S 43/235* (2018.01); *F21Y 2115/10* (2016.08)

(58) Field of Classification Search
CPC .. F21S 43/51; F21S 43/30; F21S 41/24; F21S 41/29
USPC .................................................. 362/544, 499
See application file for complete search history.

(56) References Cited

U.S. PATENT DOCUMENTS

| | | | | |
|---|---|---|---|---|
| 2004/0114392 A1* | 6/2004 | Hou | ..................... | B60Q 1/2696 362/545 |
| 2008/0225542 A1* | 9/2008 | Mertens | ............... | B60Q 1/0058 362/517 |
| 2009/0073705 A1* | 3/2009 | Tsai | ..................... | B60Q 1/2607 362/485 |
| 2010/0290243 A1* | 11/2010 | Janssen | ................ | B60Q 1/0041 362/551 |
| 2011/0149585 A1* | 6/2011 | Dubosc | ................... | F21V 13/10 362/519 |
| 2013/0051059 A1* | 2/2013 | Abai | ...................... | B60Q 1/068 362/523 |
| 2014/0160779 A1* | 6/2014 | Pusch | .................. | B60Q 1/2607 362/511 |

FOREIGN PATENT DOCUMENTS

| | | | | |
|---|---|---|---|---|
| JP | 2013131454 A | * | 7/2013 | ............. F21S 43/14 |
| WO | WO 2014180813 A1 | * | 11/2014 | ........... B60Q 1/0041 |

OTHER PUBLICATIONS

Muegge Martin, Illumination device for vehicles, Nov. 30, 2011, EP 2390137 A1.*

Ohashi Hayato, Tail light device for a vehicle, Oct. 29, 2014, EP 2796318 A1.*

* cited by examiner

US 10,328,846 B2

TAIL LIGHT DEVICE FOR AN AUTOMOBILE

CROSS-REFERENCE TO RELATED APPLICATION

This application claims priorities of Taiwanese Patent Application No. 104219820, filed on Dec. 10, 2015 and Taiwanese Patent Application No. 104218382, filed on Nov. 17, 2015.

FIELD

The disclosure relates to a light device for an automobile, and more particularly to a tail light device having a plurality of light emitting modules.

BACKGROUND

Referring to FIGS. 5 to 7, a conventional automobile tail light device includes a shell 5 and two light emitting modules 6. The shell 5 has a housing 51 and a light shade 53 cooperatively defining an accommodation chamber 52, and a support frame 54 disposed in the accommodation chamber 52 and having two holding holes 541 for holding the light emitting modules 6. Each light emitting module 6 includes a base seat 61, a control board 62 mounted on the base seat 61, a plurality of light emitting members 621 mounted on and controlled by the control board 62, a light guiding seat 63 mounted on and extending rearwardly from the base seat 61 to surround the light emitting members 621 to define a light guiding space therein, a reflector plate 64 mounted in the light guiding space, an annular frame 65 attached to an inner surface of the light guiding seat 63, and a semi-translucent plate 66 disposed in the annular frame 65 and spaced apart from the reflector plate 64.

Such light emitting module 6 has a large number of component parts, which are required to be individually mounted in sequence in the accommodation chamber 52, thereby rendering the assembly task inconvenient.

SUMMARY

Therefore, an object of the disclosure is to provide a tail light device that can alleviate at least one of the drawbacks of the prior art.

According to the disclosure, the tail light device includes a housing having a base seat which is disposed to be mounted at a rear of the automobile, and a surrounding wall which extends in a front-and-rear direction from a periphery of the base seat to define an accommodation chamber therein and to terminate at a rear edge. A light shade is connected to the rear edge to enclose the accommodation chamber. A mounting fixture is an integrally formed frame, and is removably connected to an inner wall surface of the surrounding wall to be accommodated in the accommodation chamber. The mounting fixture has a mounting wall which extends in a plane that is normal to the front-and-rear direction and which has two first mounting wall portions that are spaced apart from each other, and a second mounting wall portion that is interposed between the first mounting wall portions. The tail light device further includes two first light emitting modules, each secured to a respective one of the first mounting wall portions and controlled to emit light when a first operation mode of the automobile occurs, and a second light emitting module secured to the second mounting wall portion to emit light when a second operation mode of the automobile occurs.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
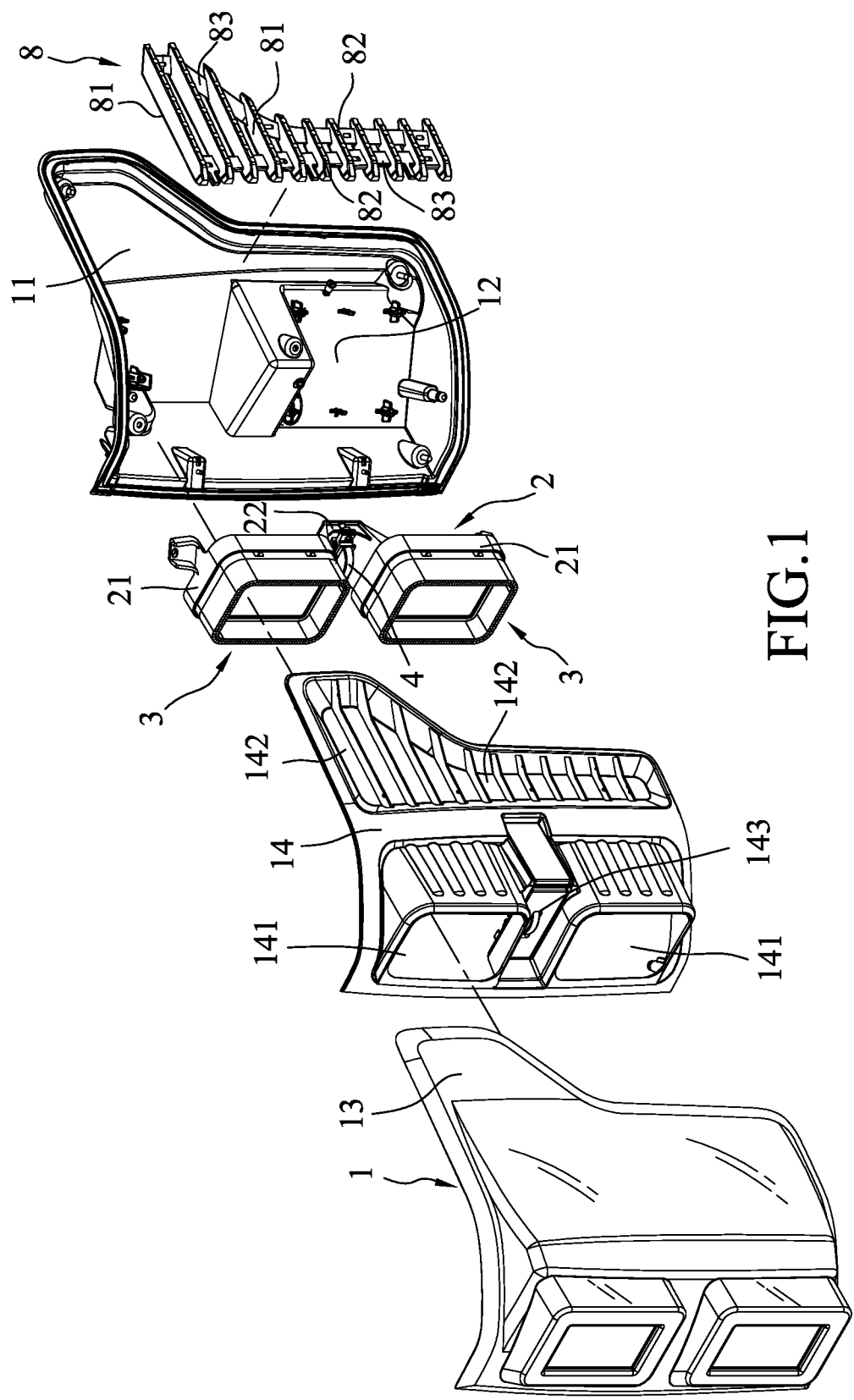
FIG. 1 is an exploded perspective view illustrating an embodiment of a tail light device according to the disclosure.

Referring to FIGS. 1 to 4, an embodiment of a tail light device according to this disclosure is shown to include a shell 1, a mounting fixture 2, two first light emitting modules 3, two retaining units 7, a second light emitting module 4 and a third light emitting module 8.

The shell 1 includes a housing 11 having a base seat 111 which is disposed to be mounted at a rear of an automobile, and a surrounding wall 112 which extends in a front-and-rear direction from a periphery of the base seat 111 to define an accommodation chamber 12 therein and to terminate at a rear edge 113. A light shade 13 is connected to the rear edge 113 to enclose the accommodation chamber 12. A holding frame 14 is connected to the rear edge 113 at a periphery thereof to be disposed in the accommodation chamber 12, and has two first holding holes 141 spaced apart from each other in an up-and-down direction, a second holding hole 143 formed between the first holding holes 141, and a plurality of third holding holes 142 formed laterally of the first and second holding holes 141, 143 and spaced apart from each other in the up-and-down direction.

The mounting fixture 2 is an integrally formed frame, and is removably connected to an inner wall surface of the surrounding wall 112 to be accommodated in the accommodation chamber 12. The mounting fixture 2 has a mounting wall 20 which extends in a plane that is normal to the front-and-rear direction and which has two first mounting wall portions 21 that are spaced apart from each other in the up-and-down direction, and a second mounting wall portion 22 that is interposed between the first mounting wall portions 21. Alternatively, the first mounting wall portions 21 may be spaced apart from each other in a left-and-right direction. The second mounting wall portion 22 may be disposed below the first mounting wall portions 21.

Each first light emitting module 3 includes a control board 31 which is secured to the respective first mounting wall portion 21, a plurality of light emitting members 311 that are mounted on and controlled by the control board 31 to emit light when a first operation mode of the automobile occurs, a light guiding seat 32 having an annular wall 320 which extends in the front-and-rear direction from the first mounting wall portion 21 to have a rear end held in the first holding hole 141 of the holding frame 14 and which surrounds the light emitting members 311 to define a light guiding space 326 therein, a front reflector plate 33 disposed in the light guiding space 326 and spaced apart from an inner surface 324 of the annular wall 320 by an annular gap 327 such that light emitted from the light emitting members 311 passes through the annular gap 327, an annular reflecting frame 35 attached to the inner surface 324 of the annular wall 320 and disposed rearwardly of the front reflector plate 33 to cooperatively define a light reflecting space 36, and a rear reflector plate 34 disposed to enclose the light reflecting space 36, and confronting and spaced apart from the front reflector plate 33 in the front-and-rear direction such that light emitted through the annular gap 327 is reflected in the light reflecting space 36.

In this embodiment, the light guiding seat 32 of each first light emitting module 3 has an incident surface 321 disposed on a front end of the annular wall 320 and confronting the light emitting members 311, a scattering surface 322 disposed on a rear end of the annular wall 320 such that the light passing through the annular gap 327 enters from the incident surface 321 and out of the scattering surface 322 to form a ring-shaped light, a refracting surface 325 disposed in the annular gap 327 and interposed between the incident surface 321 and the annular reflecting frame 35 such that the light transmitted from the incident surface 321 is refracted by the refracting surface 325 and then reflected in the light reflecting space 36, and an annular attachment wall 323 extending radially and inwardly from the front end of the annular wall 320 for the front reflector plate 33 to be attached thereto. In this embodiment, each first light emitting module 3 is in the form of a running and brake light from which a light is emitted when the first operation mode is a running or brake operation mode. Alternatively, each first light emitting module 3 may be in the form of a running light, a brake light, a turning light, a fog light or the like.

Each retaining unit 7 is disposed to retain the respective first light emitting module 3 to the respective first mounting wall portion 21, and includes a plurality of first through holes 76 formed in and through the first mounting wall portion 21, a plurality of second through holes 73 formed in and through the control board 31, a plurality of lugs 74 mounted on the light guiding seat 32 and each having a lug hole 741 that is registered with the first and second through holes 76, 73, a plurality of sockets 75 mounted on and extending forwardly from the front reflector plate 33 to extend through the lug hole 741 and each having internally threaded portion 751, and a plurality of screw bolts 71, each extending through the first and second through holes 76, 73 and threadedly engaged with the internally threaded portion 751. The control board 31, the light guiding seat 32 and the front reflector plate 33 can be mounted to the first mounting wall portion 21 by means of the screw bolts 71 so as to facilitate assembly and disassembly of the first light emitting module 3.

The second light emitting module 4 is secured to the second mounting wall portion 22 to emit light when a second operation mode of the automobile occurs. The second light emitting module 4 extends rearwardly to have a rear end held in the second holding hole 143 of the holding frame 14. In this embodiment, the second light emitting module 4 is in the form of a backup light from which light is emitted when the second operation mode is a backup operation mode. Note that the second light emitting module 4 may be alternatively in the form of a running light, a turning light, a brake light, a fog light or the like.

The third light emitting module 8 is disposed in the accommodation chamber 12 and laterally of the first and second light emitting modules 3, 4, and includes a plurality of light guide members 81 that are spaced apart from each other in the up-and-down direction and that are held in the third holding holes 142 of the holding frame 14, two connecting members 83, each of which interconnects the light guide members 81, and a plurality of light scattering protrusions 82 disposed on the light guide members 81 and confronting laterally. Light is reflected and refracted by the light scattering protrusions 82 to achieve a light scattering effect. To fabricate the third light emitting module 8, the light guide members 81 are connected to the connecting members 83 to form a single modular structure which is then mounted on the housing 11.

Figure 2:
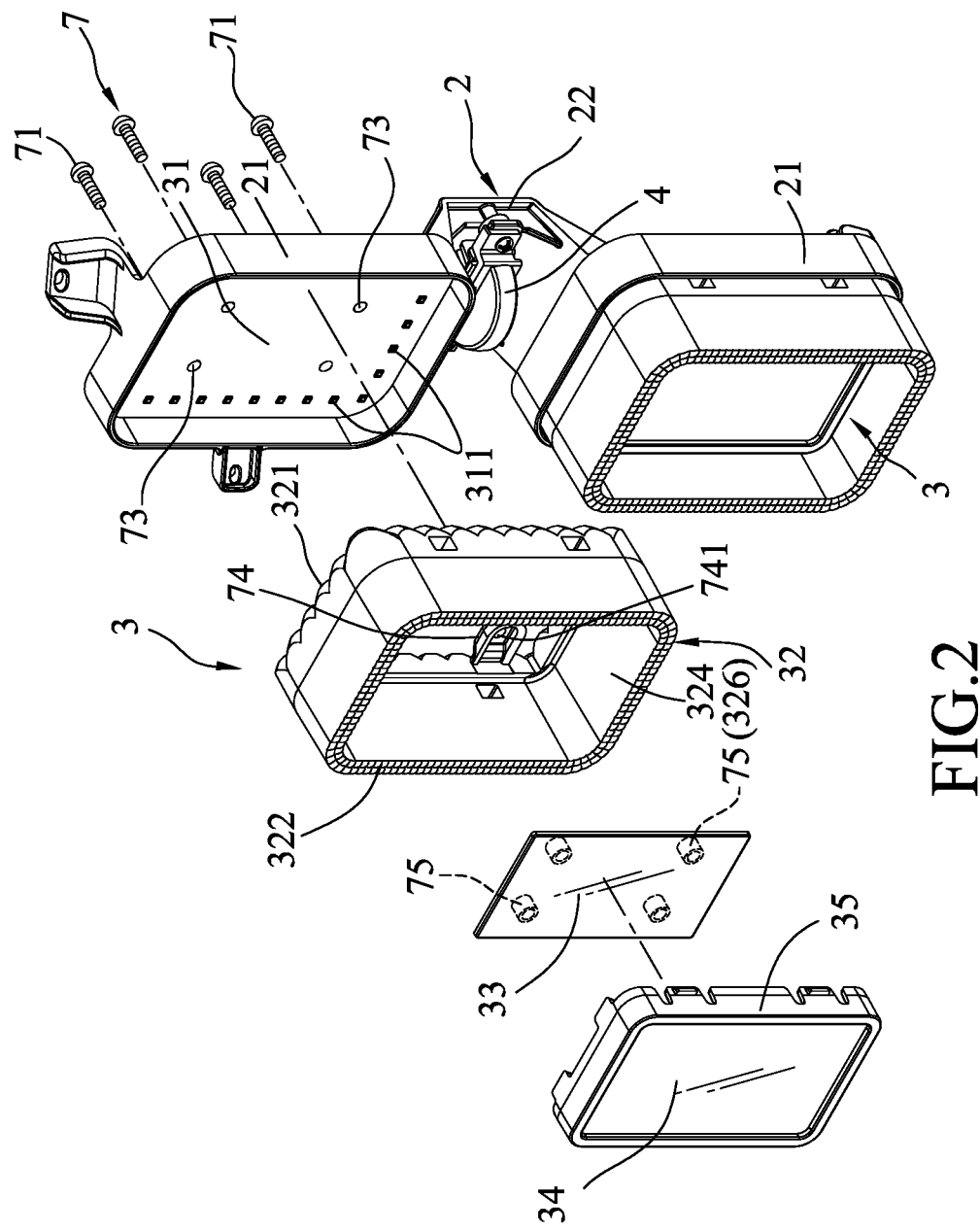
FIG. 2 is a partly exploded perspective view of a portion of the embodiment.
Figure 3:
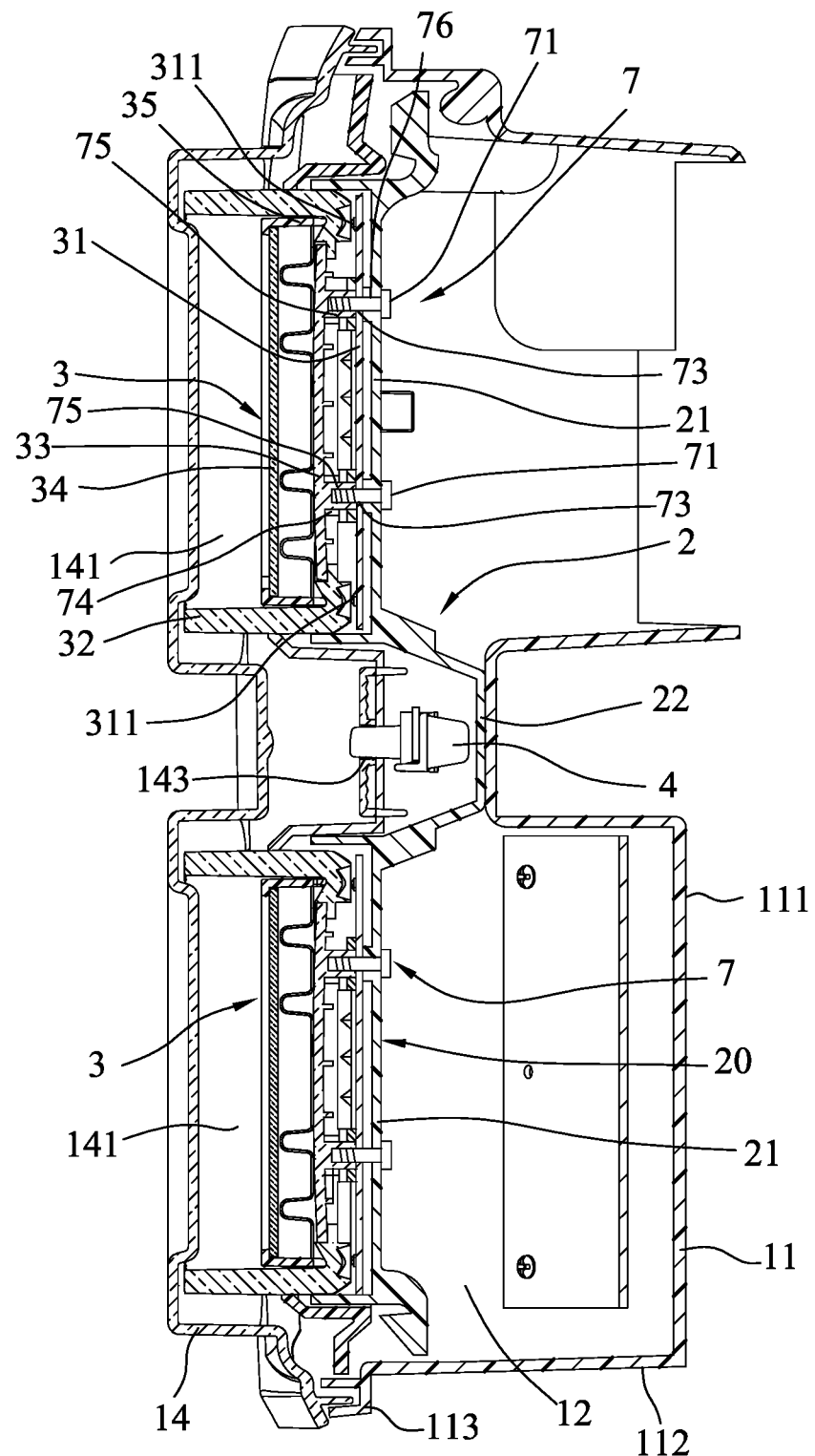
FIG. 3 is a fragmentary sectional view of the embodiment.
Figure 4:
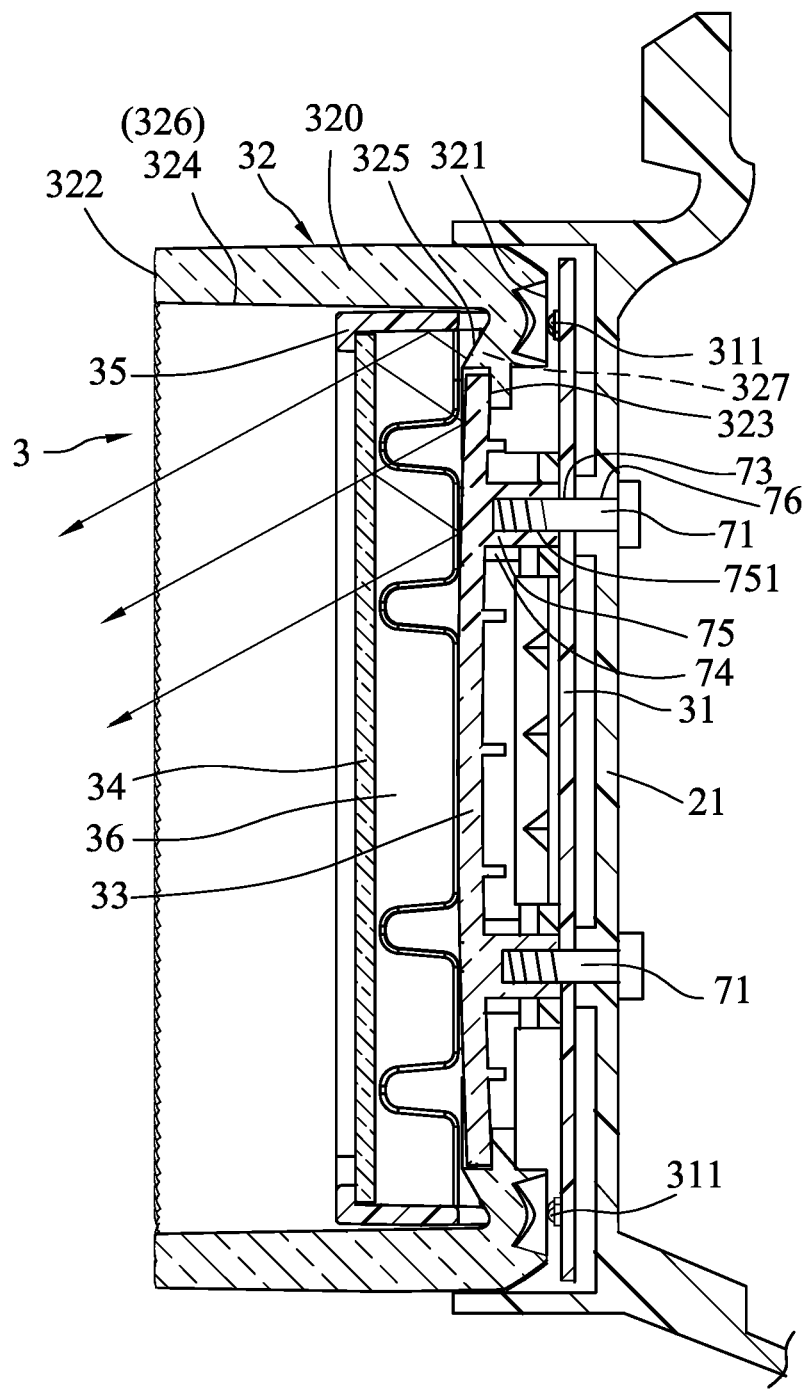
FIG. 4 is an enlarged, fragmentary sectional view of the embodiment.
Figure 5:
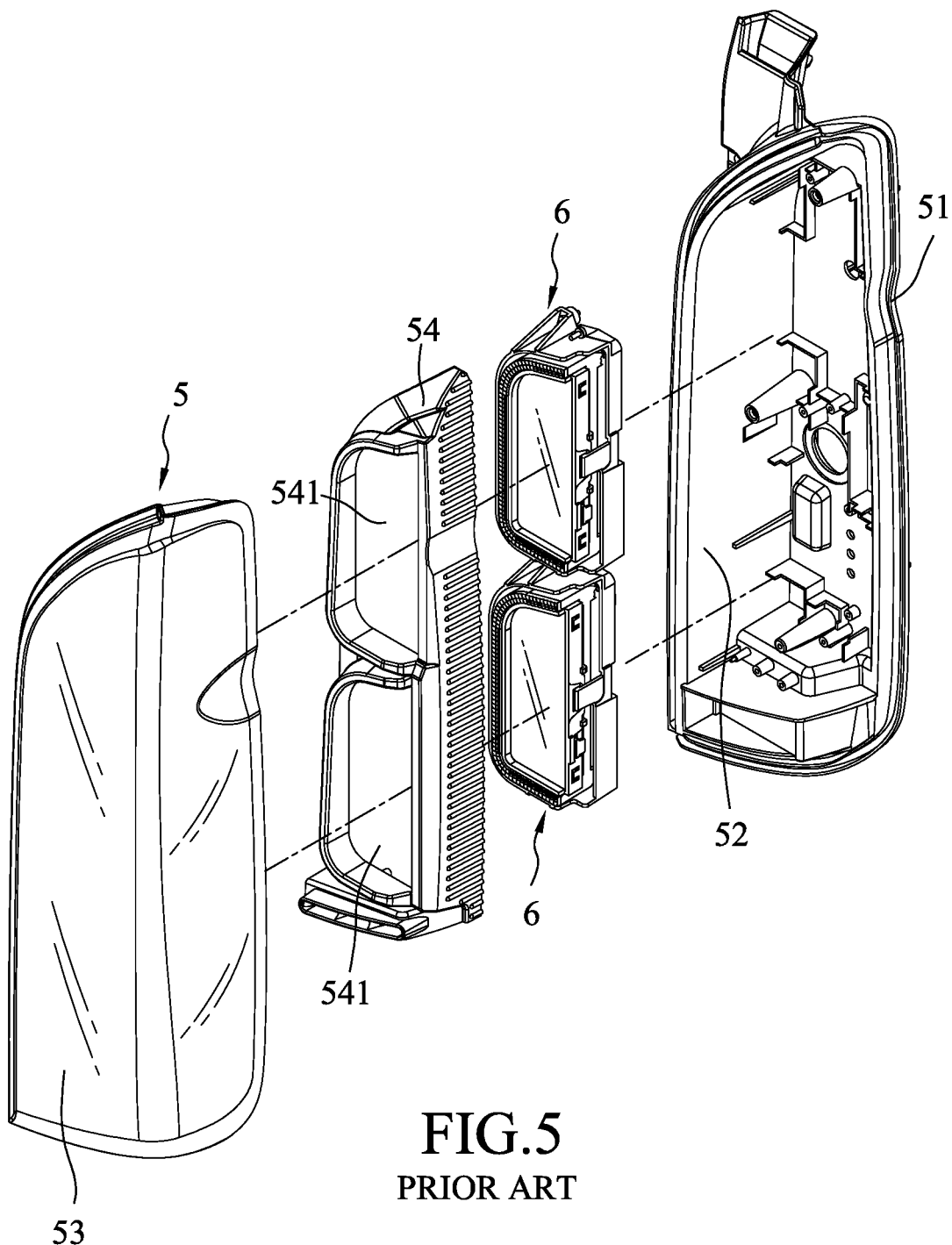
FIG. 5 is an exploded perspective view of a conventional tail light device.
Figure 6:
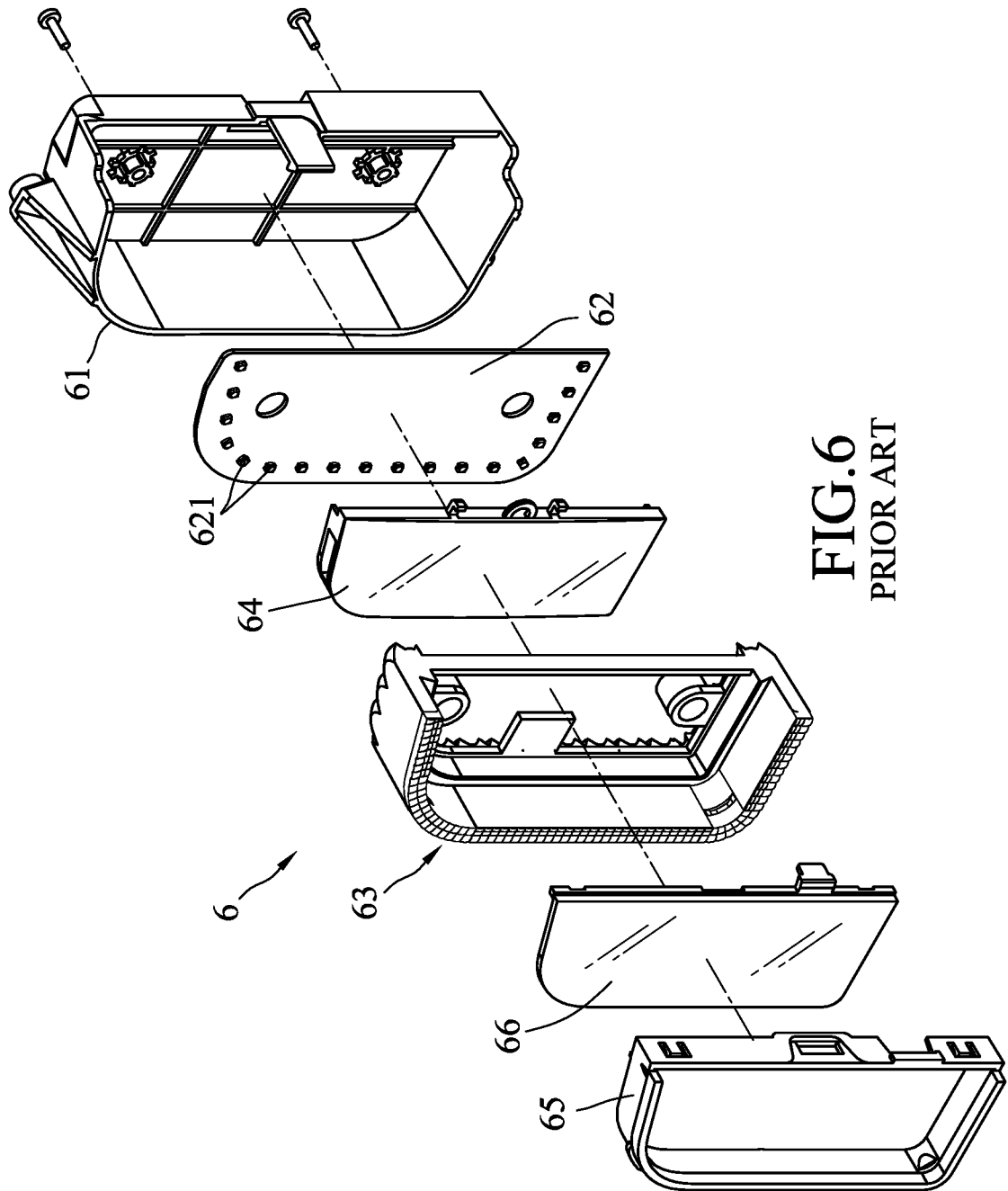
FIG. 6 is an exploded perspective view of a first light emitting module of the conventional tail light device.
Figure 7:
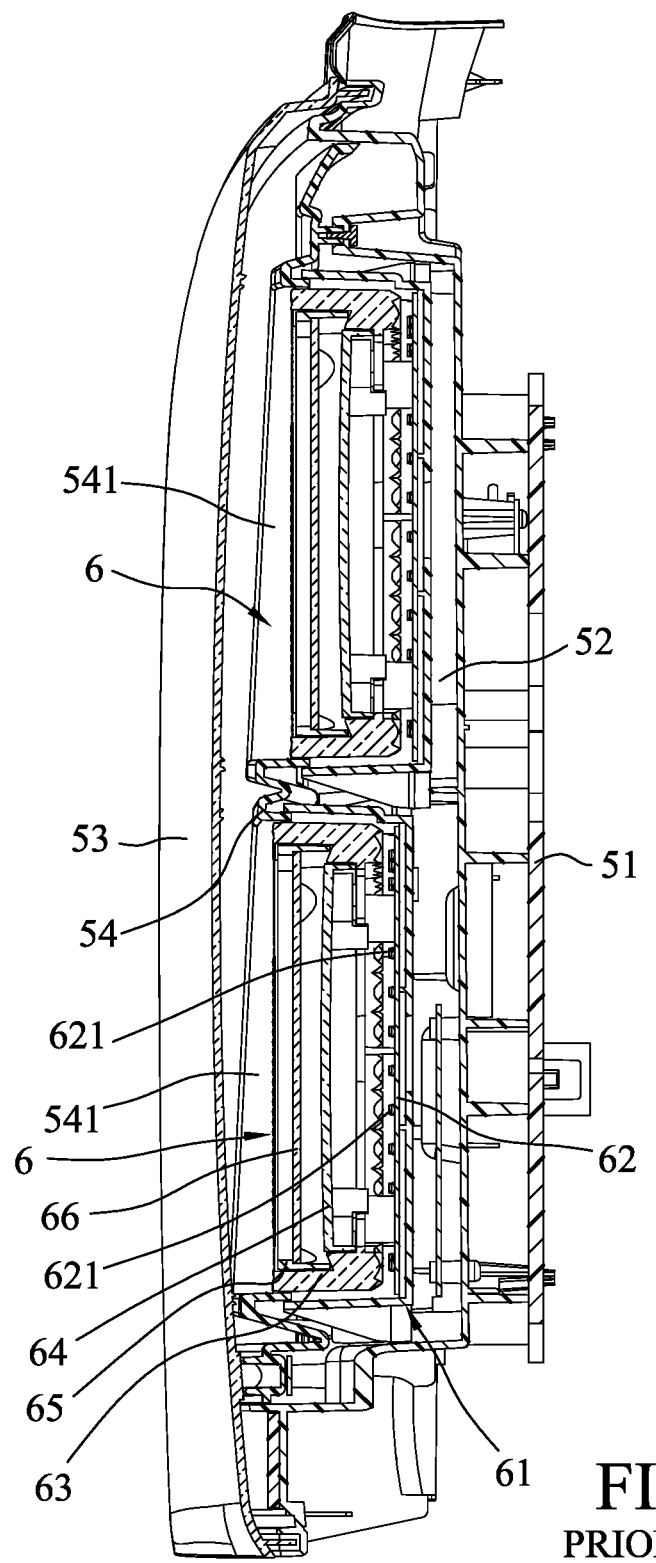
FIG. 7 is a fragmentary sectional view of the conventional tail light device.

Referring to FIGS. 2 and 4, in this embodiment, each light emitting member 311 of the first light emitting module 3 is in the form of LED which can emit a weak red light as a running light or a strong red light as a brake light by a circuit control. In use, when the tail light device is in a running state, the light emitting members 311 emit the weak red light, part of which enters from the incident surface 321 and out of the scattering surface 322 to form a ring-shaped light, and part of which is refracted by the refracting surface 325 and then reflected by the annular reflecting frame 35 in the light reflecting space 36. The light in the light reflecting space 36 is then reflected by the rear reflector plate 34, which is configured as a semi-translucent plate, such that part of the light passes through the rear reflector plate 34 while part of the light is reflected to the front reflector plate 33 and is then reflected again in the light reflecting space 36 or passes through the rear reflector plate 34. Due to reflection of light in the light reflecting space 36, the luminance of the light emitted by the first light emitting module 3 decreases radially and inwardly so as to provide variation in illumination pattern and increase conspicuity of the automobile. A desired shape and luminance of the light can be achieved by controlling the luminance intensity of the light emitting members 311.

Similarly, when the tail light device is in a brake state, the light emitting members 311 emit strong red light, which is projected to the rear reflector plate 34 through the annular reflecting frame 35 and reflected between the front and rear reflector plates 33, 34 so as to increase conspicuity of the automobile for safety purposes.

As illustrated, with the structure of the mounting fixture 2 on which the first light emitting modules 3 and the second light emitting module 4 are mounted to form a modular construction, the assembly procedure is simplified by simply mounting the modular construction in the accommodation chamber 12 of the shell 1. On the other hand, during assembly of the shell 1 and the modular construction, it is advantageous that the shell 1 is placed on an assembly line after the modular construction has been completely fabricated, which can shorten the amount of time that the shell 1 is on the assembly line to minimize possibility of damage to the shell 1, and which can reduce the defective rate of the tail light device.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A tail light device for an automobile, comprising:
a housing having a base seat which is disposed to be mounted at a rear of the automobile, and a surrounding wall which extends in a front-and-rear direction from a periphery of said base seat to define an accommodation chamber therein and to terminate at a rear edge;
a light shade connected to said rear edge to enclose said accommodation chamber;
a mounting fixture which is an integrally formed frame, and which is removably connected to an inner wall surface of said surrounding wall to be accommodated in said accommodation chamber, said mounting fixture having a mounting wall which extends in a plane that is normal to the front-and-rear direction and which has two first mounting wall portions that are spaced apart from each other, and a second mounting wall portion that is interposed between said first mounting wall portions;
two first light emitting modules, each secured to a respective one of said first mounting wall portions, and controlled to emit light when a first operation mode of the automobile occurs, each of said first light emitting modules including a control board secured to the respective one of said first mounting wall portions, a plurality of light emitting members mounted on and controlled by said control board, a light guiding seat having an annular wall which extends in the front-and-rear direction and which surrounds said light emitting members to define a light guiding space therein, a front reflector plate disposed in said light guiding space and spaced apart from said annular wall by an annular gap such that light emitted from said light emitting members passes through said annular gap, an annular reflecting frame attached to an inner surface of said annular wall and disposed rearwardly of said front reflector plate to cooperatively define a light reflecting space, and a rear reflector plate disposed to enclose said light reflecting space, and confronting and spaced apart from said front reflector plate in the front-and-rear direction such that light emitted through said annular gap is reflected in said light reflecting space;
a second light emitting module secured to said second mounting wall portion to emit light when a second operation mode of the automobile occurs; and
two retaining units, each disposed to retain a respective one of said first light emitting modules to the respective one of said first mounting wall portions, each of said retaining units including a plurality of first through holes formed in and through said first mounting wall portion, a plurality of second through holes formed in and through said control board, a plurality of lugs mounted on said light guiding seat and each having a lug hole that is registered with said first and second through holes, a plurality of sockets mounted on and extending forwardly from said front reflector plate to extend through said lug hole and each having internally threaded portion, and a plurality of screw bolts, each extending through said first and second through holes and threadedly engaged with said internally threaded portion.

2. A tail light device for an automobile, comprising:
a housing having a base seat which is disposed to be mounted at a rear of the automobile, and a surrounding wall which extends in a front-and-rear direction from a periphery of said base seat to define an accommodation chamber therein and to terminate at a rear edge;
a light shade connected to said rear edge to enclose said accommodation chamber;
a mounting fixture which is an integrally formed frame, and which is removably connected to an inner wall surface of said surrounding wall to be accommodated in said accommodation chamber, said mounting fixture having a mounting wall which extends in a plane that is normal to the front-and-rear direction and which has two first mounting wall portions that are spaced apart from each other, and a second mounting wall portion that is interposed between said first mounting wall portions;
two first light emitting modules, each secured to a respective one of said first mounting wall portions, and controlled to emit light when a first operation mode of the automobile occurs, each of said first light emitting modules including a control board secured to the respective one of said first mounting wall portions, a plurality of light emitting members mounted on and controlled by said control board, a light guiding seat having an annular wall which extends in the front-and-rear direction and which surrounds said light emitting members to define a light guiding space therein, a front reflector plate disposed in said light guiding space and spaced apart from said annular wall by an annular gap such that light emitted from said light emitting members passes through said annular gap, an annular reflecting frame attached to an inner surface of said annular wall and disposed rearwardly of said front reflector plate to cooperatively define a light reflecting space, and a rear reflector plate disposed to enclose said light reflecting space, and confronting and spaced apart from said front reflector plate in the front-and-rear direction such that light emitted through said annular gap is reflected in said light reflecting space, wherein said light guiding seat of each of said first light emitting modules further has an incident surface disposed on a front end of said annular wall and confronting said light emitting members, a scattering surface disposed on a rear end of said annular wall such that the light passing through said annular gap enters from said incident surface and out of said scattering surface to form a ring-shaped light, a refracting surface disposed in said annular gap and interposed between said incident surface and said annular reflecting frame such that the light from said incident surface is refracted by said refracting surface and then reflected in said light reflecting space, and an annular attachment wall extending radially and inwardly from said front end of said annular wall for said front reflector plate to be attached thereto; and
a second light emitting module secured to said second mounting wall portion to emit light when a second operation mode of the automobile occurs.

3. The tail light device as claimed in claim 2, wherein each of said first light emitting modules is in a form of a running-and-brake light from which a light is emitted when the first operation mode is a running or brake operation mode, and said second light emitting module is in a form of a backup light from which a light is emitted when the second operation mode is a backup operation mode.

4. A tail light device for an automobile, comprising:
a housing having a base seat which is disposed to be mounted at a rear of the automobile, and a surrounding wall which extends in a front-and-rear direction from a periphery of said base seat to define an accommodation chamber therein and to terminate at a rear edge;

a light shade connected to said rear edge to enclose said accommodation chamber;

a mounting fixture which is an integrally formed frame, and which is removably connected to an inner wall surface of said surrounding wall to be accommodated in said accommodation chamber, said mounting fixture having a mounting wall which extends in a plane that is normal to the front-and-rear direction and which has two first mounting wall portions that are spaced apart from each other, and a second mounting wall portion that is interposed between said first mounting wall portions;

two first light emitting modules, each secured to a respective one of said first mounting wall portions, and controlled to emit light when a first operation mode of the automobile occurs;

a second light emitting module secured to said second mounting wall portion to emit light when a second operation mode of the automobile occurs;

a third light emitting module which is disposed in said accommodation chamber and laterally of said first and second light emitting modules and which includes a plurality of light guide members that are spaced apart from each other in an up-and-down direction, and at least one connecting member which interconnects said light guide members; and a holding frame which is interposed between said surrounding wall of said housing and said light shade in the front-and-rear direction and which has two first holding holes for respectively holding said first light emitting modules, a second holding hole for holding said second light emitting module, and a plurality of third holding holes for respectively holding said light guide members.

5. The tail light device as claimed in claim 4, wherein said third light emitting module further includes a plurality of light scattering protrusions disposed on said light guide members and confronting laterally.

* * * * *